United States Patent Office 3,827,899
Patented Aug. 6, 1974

---

3,827,899
MODIFIED MICROCRYSTALLINE CELLULOSE DISPERSION
Amnon Dov Zirlin, Haifa, Israel, assignor to Centre for Industrial Research (CIR) Ltd., Haifa, Israel
No Drawing. Filed July 27, 1972, Ser. No. 275,776
Claims priority, application Israel, Sept. 28, 1971, 37,810/71
Int. Cl. C08b 25/00, 27/18
U.S. Cl. 106—208
4 Claims

ABSTRACT OF THE DISCLOSURE

A modified microcrystalline cellulose is obtained by the interaction of microcrystalline cellulose with guar-gum in an aqueous medium. This modified microcrystalline cellulose functions simultaneously as a body enhancer, cloudifier and suspending agent in acidic soft drinks and prevents the settling of the pulp particles present in the soft drinks and/or the formation of the "ring" in the upper layer of the drinks.

---

This invention relates to a new additive to be used for the stabilization of the suspension in soft drinks.

Stabilizers are used in various branches of the food industry to prevent the occurrence of undesirable changes. Though the invention is applicable in principle to all kinds of soft drinks, it is of especial importance in regard to acidic soft drinks and mainly to those acidic soft drinks which contain pulp particles such as juice (citrus, tomatoes etc.).

The term "soft drinks" embraces syrups, carbonated beverages and still beverages. The carbonated beverages being either flavored with sugar, essence and acid or un-flavored containing carbon dioxide and minerals. The still beverage may either be friut juice with or without added sugar and water or it may contain flavoring material, sugar and acid proportioned with water.

The composition and stability of the colloidally dispersed materials in soft drinks affect considerably the quality of the products. The reason is that these materials contribute to the flavor, color appearance and texture of the beverage.

From the standpoint of appearance, one of the undesirable features of juice containing suspended solids is the tendency of the solid to settle during storage. This is particualrly noticeable in juice packed in glass, but it may not be evident to the consumer although it exists when juice is packed in cans. This is the result of the instability of suspended colloids and of the emulsion used for imparting flavor. The precipitation will be more visible in a soft drink which contains more pulp particles.

Another manifestation of colloidal instability is the formation of a "ring" at the top of the bottle.

Various additives are known in the soft drinks industry to improve their quality; for instance emulsions based on brominated oils are the conventional clouding agents used. However, in the last years the food safety authorities in many countries banned the use of these reagents due to their potential health hazards. In addition to that, these clouding agents have been found to have an unsatisfactory stabilization of the suspension, especially for soft drinks containing natural pulp.

Some derivatives of fatty acids in conjunction with gums were also suggested to enhance the opacity, and colloidal stability of soft drinks. But these reagents do not prevent the precipitation of the pulp and do not increase the stability of the colloidal suspension in the acidic soft drink.

In the last years various gums such as alginates, carrageenans, gum arabic, locust bean gum, carboxymethyl cellulose or various types of starches have been used as body enhancers suspending agents. However, although they were found to be effective in increasing the viscosity of the soft drink, their capacity to retard the sedimentation of suspended pulp is limited.

Thus it was long felt desirable to find an additive which would prevent the sedimentation of the pulp in acidic soft drinks in obtaining a homogenized drink.

The present invention has the object to provide a new additive for preventing the precipitation of the pulp in acidic soft drinks.

It is another object of the present invention to provide an additive which fulfills in addition to prevention of the precipitation of the solids in acidic soft drinks, the purposes of other additives for soft drinks such as body enhancer and cloudifier.

The invention therefore, consists of a modified microcrystalline cellulose dispersion prepared by the interaction of microcrystalline cellulose and guar-gum in an aqueous medium characterized by its outstanding stability in acidic soft drinks. The term guar-gum includes also fractions of guar-gum. The new additive was found to be very useful in the stabilization of suspensions in acidic soft drinks, preventing the settling of the pulp particles and/or formation of a "ring" in the upper layer of soft drinks.

Microcrystalline cellulose has been suggested as a clouding agent for a beverage prepared in a powder form. But its dispersibility and stability in acidic soft drinks is quite poor. Also guar-gum alone or other fractons of this gum used in food industries were tried with a rather limited success to accomplish this function of preventing the settling of the pulp. Thus, it has now been unexpectedly found that the modified microcrystalline cellulose dispersion can successfully prevent the settling of pulp, and simultaneously fulfill the functions of body enhancer and coludifier required for soft drinks. This prevention of settling the pulp occurs only when the modified microcrystalline cellulose dispersion is prepared prior to its addition to the soft drink. By adding separately the mcirocrystalline and guar-gum directly to the soft drink, no interaction between the components occurs and no stabilization effect of the suspension is obtained.

The modified microcrystalline dispersion is the result of the interaction of the two ingredients, microcrystalline cellulose or guar-gum in development of a different property which is not possessed by the two ingredients taken separately. The exact structure of the modified microcrystalline cellulose is unknown. It seems that the interaction between the microcrystalline cellulose and guar-gum takes place by a sort of cross-linking in resulting a new colloidal structure.

The term guar-gum includes also fractions of this gum having molecular weight as expressed by its viscosity in the range of 2800 to 69,000 cps. It was surprisingly found that other types of food grade gums are not suitable for this preparation since the microcrystalline cellulose does not interact with the gum to form a stable suspension in acidic media. Thus, for example, locust bean gum, which like guar-gum is also a galactomannan and both are hydrophilic colloids with very similar properties in solution, and a similar viscosity, is not suitable for the preparation of the modified microcrystalline cellulose.

The preparation of the modified microcrystalline cellulose is very simple: the microcrystalline cellulose and guar-gum are dispersed in neutral or slightly alkaline water. It is preferable to incorporate in the solid microcrystalline cellulose a dispersing agent such as carboxymethyl cellulose to render the cellulose more dispersible in aqueous systems. The suspension is vigorously mixed by the use of a shearing device such as Waring Blendor.

The amount of guar-gum which interacts with the microcrystalline cellulose in obtaining the modified microcrystalline cellulose is not critical. The preferable amount is between the range of 1 part guar-gum, to 0.5 parts, to 12 parts of microcrystalline cellulose. Generally a modified microcrystalline cellulose containing smaller amounts of guar-gum will effectively stabilize the suspension when no fruit pulp is present in the system and when the system does not undergo pasteurization and is stored under refrigeration. However, fruit juices consist of considerable quantities of finely divided suspended fruit solids. The amount of suspended solids varies according to the fruit; for instance it is between 7–13% (volume) for orange juice and 3.5–11% (volume) for grapefruit juice. In these cases, the modified microcrystalline cellulose is preferred to contain at least 25% of guar-gum.

With citrus syrups (20° Brix) designed for home use normally an unpleasant phenomenon of a "ring" formation in the upper layer occurs. This "ring" contains actually the main components of the flavor. It was found that by using the modified microcrystalline cellulose obtained according to the present invention the formation of this ring is prevented.

The preparation of the modified microcrystalline cellulose is done at ambient temperature. In some cases such as concentrated juices, higher temperatures than the ambient might be desirable.

The modified microcrystalline cellulose has properties which cannot be accounted for by the additive contribution of its two components. One of the tests which proves this fact is filtration. The filtration test is illustrated in Table I where the filtration rates of a solution of 0.25% microcrystalline cellulose and of a solution of 0.25% modified microcrystalline cellulose are given. The filtration was done on the same aliquot of 10 ml. of dispersion through a qualitative Whatman No. 1 filter paper having a filtration area of 4.5 cm.$^2$. The filtration was carried out at ambient temperature (25° C.) under a pressure gradient of 715 mm. Hg (achieved by a vacuum pump).

TABLE I

| Filtration rate of 0.25% microcrystalline cellulose dispersion | | Filtration rate of 0.25% modified microcrystalline cellulose dispersion | |
|---|---|---|---|
| Filtration volume, ml. | Filtration time, min. | Filtration volume, ml. | Filtration time, min. |
| 1.5 | 0.25 | 1 | 2 |
| 2 | 0.5 | 2 | 9 |
| 3.5 | 6 | 3.25 | 52 |
| 4 | 9.6 | 4 | 117 |
| 5 | 18 | 4.8 | 199 |
| 7 | 47 | 5.2 | 245 |

Thus with a dispersion of microcrystalline cellulose 7 ml. of filtrate were obtained after 47 minutes whereas with a dispersion of modified microcrystalline cellulose 5.2 ml. of filtrate were obtained after 245 minutes.

The above data prove clearly the different behaviour of the two dispersions. By calculating from all above figures the resistance to flow of the two suspensions it results that the modified microcrystalline cellulose has a resistance to flow 12.5 times greater than the normal microcrystalline cellulose. The guar-gum itself which is used in the preparation of the modified microcrystalline cellulose has a negligible resistance to flow: 10 ml. of a 0.05% guar-gum dispersion were obtained as filtrate in 15 seconds.

Another physical test which shows the difference of the modified microcrystalline cellulose from the two elements from which it consists is the viscosity. In the following Table II, are given viscosities of the guar-gum microcrystalline cellulose and modified microcrystalline cellulose dispersions.

TABLE II

| Dispersion | Specific viscosity after— | |
|---|---|---|
| | Preparation | 5 days |
| Guar-gum | 0.25 | 0.26 |
| Microcrystalline cellulose | 0.42 | 0.46 |
| Modified microcrystalline cellulose | 0.7 | 0.92 |

From the above values it is evident that a build-up of structure occurs in the resulting stored system containing microcrystalline cellulose interacted with guar-gum.

This phenomenon known as thixotropy proves also that the interaction which occurred between the microcrystalline cellulose and guar-gum by a sort of cross-linking, imposes an array of a characteristic colloidal system.

It seems that due to these improved physical properties of the modified microcrystalline cellulose this material is successful in the stabilization of the suspension in the soft drinks.

The microcrystalline cellulose may be used in its pure state or preferably in its commercial form known under the trademark "Avicel–RC–581" produced by FMC Corporation (Philadelphia, U.S.A.). This material contains 89 parts by weight of microcrystalline cellulose and 11 parts of sodium carboxymethyl cellulose. The sodium carboxymethyl cellulose is normally required as a dispersant additive but it does not interact with the microcrystalline cellulose to stabilize acidic systems. It was also found that the addition of quantities of carboxymethyl cellulose ranging from 10–200% on the basis of Avicel–RC–581 did not stabilize the suspension at low pH values. The use of the modified microcrcystalline cellulose in soft drinks has several advantages. Among them are:

(1) All the components used in the modified microcrystalline cellulose are known and permitted to be incorporated in the food industry.

(2) The modified microcrystalline cellulose functions simultaneously as a body enhancer, cloudifier and suspending agent.

(3) The combination of these three functions is quite unique and very useful in the soft drinks and especially in those containing large amounts of pulp (orange juice, grapefruit juice, tomato juice) where the function of prevention of the sedimentation of the pulp is very important.

The following is a general description of the use of the modified microcrystalline cellulose:

The aqueous dispersion of modified microcrystalline cellulose is mixed with the soft drink i.e. sugar-acid solution, juice etc. The amount of modified microcrystalline cellulose required for acidic soft drink to prevent settling is at least 0.02% wt. percent. Preferably this amount is between 0.05% to 0.75%. After that it is preferable to shear the mixture using a Waring Blender or a sonicator. The final system may be pasteurized and then stored at ambient temperature or under refrigeration. The pH of the product may be as low as 2 and the stability of the system is not impaired by the acidic conditions characteristic to soft drinks and juices. The suspension was stable and the system was homogeneous without precipitation of the pulp even after six months of storage at 1–4° C.

The modified microcrystalline cellulose was found to be successfully used for acidic soft drinks including syrups and juices where more pulp is present and the problem of the stabilization of suspension is more evident.

When juices such as orange juice are added to the system it should be first pasteurized and sheared since otherwise the stability of the products will be impaired.

When juice concentrates such as orange juice concentrates are added to the system they may be either reconcentrated prior to incorporating them in the product or added as concentrates.

The invention is illlstrated by the following examples to which it is not limited.

EXAMPLE 1

80 mg. guar-gum (trademark Meyprogat 90) and 250 mg. microcrystalline cellulose were dispersed in 50 ml. of tap water in the presence of 30 mg. of sodium carboxymethyl cellulose by shearing for 5 minutes in a Waring Blender at 25–35° C.

To the above dispersion 17 ml. of sucrose-citrate buffer (containing 20% sucrose and 6% citrate) and 33 ml. of grapefruit juice and orange juice were then added. The samples were pasteurized in 20 x 150 mm. test tubes by heating for 12 minutes at 70° C. and then storing at 30° C. After a three-months' storage, the phase containing the mixture of juice pulp and modified microcrystalline particles occupied 97% of the total volume of the samples.

In blanks not containing the modified microcrystalline cellulose, sedimentation of fruit pulp to the bottom of the test tubes occurred after a few days. In blanks containing the regular microcrystalline cellulose, the lower phase containing the suspended particles occupied only 50% of the total volume, after a one week storage at 30° C.

EXAMPLE 2

Two batches of 50 mg. of guar-gum (trademark Meyprogat 90) and 250 mg. microcrystalline cellulose were dispersed in the presence of 30 mg. of carboxymethyl cellulose in 50 ml. of tap water by shearing for 5 minutes in a Waring Blender at 25–35° C.

To each one of the above dispersion 17 ml. of sucrose-citrate buffer pH 3.25 and 33 ml. of Schweppes Bitter Lemon (Jafora Ltd., Rehovot, Israel) and Schweppes Golden Orange (Jafora Ltd., Rehovot, Israel) were then added.

The samples were stored at 1–4° C. The phase containing the suspended particles occupied 90–98% of the total volume even after a three months' storage.

EXAMPLE 3

5 g. of microcrystalline cellulose and 1.485 g. guar-gum (trademark Meyprogat 90) were dispersed in 100 ml. $H_2O$ in a Waring Blender for 5 minutes in the presence of 0.5 g. sodium carboxymethyl cellulose. The mixture was heated to about 80° C. for ten minutes.

50 g. of orange concentrate (60° Brix) were mixed with 50 g. of the above modified microcrystalline cellulose. The paste was diluted with 450 ml. water and the diluted suspension was heated to 85° C. and then cooled to ambient temperature. The suspension was then mixed with an equal volume of sucrose-citrate buffer pH 3.25 (containing 1.5% citrate and 5% sucrose). The final dispersion was sheared in a Waring Blender for 3 minutes and then pasteurized (see Example 1). It was stable on storage at ambient temperature, for three months.

EXAMPLE 4

(The preparation of the dispersion was done at 25–30° C.). 250 mg. Avicel RC–581 and 50 mg. guar-gum (Meyprogat 90) were dispersed in 75 ml. water by shearing for five minutes in a Waring Blender. 25 ml. of a sucrose-citrate buffer, pH 3.25 (containing 21% sucrose and 6% citrate) were then added. The suspension was stable even after a six month storage under refrigeration. When the amount of guar-gum dispersed with the Avicel was reduced to 20 mg. (per 100 ml. final product) the suspension was stable for two months under refrigeration while in systems not containing guar-gum but only Avicel flocculation and precipitation occurred immediately on adding the citrate.

EXAMPLE 5

200 mg. guar-gum (trademark Meyprogat 90) and 500 mg. Avicel RC 581 were dispersed in 50 ml. water by shearing in a Waring Blender for 5 minutes at ambient temperature (25–30° C.). 17 mls. of a sucrose-citrate buffer pH 3.2 (containing 20% sucrose and 6% citrate) were then added, followed by 133 ml. of a freshly extracted tomato juice (the tomatoes were heated to about 80° C. prior to extracting them). The volume was made up to 200 ml. and the solution was then sheared for 3 minutes in a Waring Blender. Samples were pasteurized for 12 minutes at 70° C. The suspension was stable after a two-months storage at ambient temperature (20–30° C.). On the other hand, in blanks not containing the modified microcrystalline cellulose, precipitation of suspended particles commenced after 2–3 days.

EXAMPLE 6

250 mg. of microcrystalline cellulose and 70 mg. guar-gum (trademark Meyprogat 90) were dispersed in 75 ml. tap water by shearing in a Waring Blender for 5 minutes at ambient temperature (25–30° C.). To this dispersion, 25 ml. of a sucrose-citrate buffer pH 3.2 (containing 20% sucrose and 6% citrate) were added. The suspension was quite stable. In a blank experiment not containing the modified microcrystalline cellulose, but only the normal microcrystalline cellulose, precipitation of cellulose occurred on adding the acidic buffer solution.

I claim:

1. A modified microcrystalline cellulose dispersion consisting essentially of the interaction product prepared by the interaction of 1 part by weight guar gum and 0.5 parts to 12 parts by weight microcrystalline cellulose.

2. A modified microcrystalline cellulose dispersion according to claim 1 which also contains sodium carboxymethyl cellulose.

3. A dispersion in accordance with claim 1 formed in a neutral or slightly alkaline aqueous medium and vigorously mixed in a shearing device and wherein said guar gum has a viscosity of 2800 to 69,000 cps.

4. A modified microcrystalline cellulose dispersion according to claim 1 to be used in acidic soft drinks as suspending agent, body enhancer and cloudifier.

References Cited
UNITED STATES PATENTS 3,440,065    4/1969    La Via _____ 106—209 X THEODORE MORRIS, Primary Examiner U.S. Cl. X.R.

106—204, 209